Oct. 5, 1965  J. W. OGDEN ETAL  3,210,635
TRANSFORMER-RECTIFIER CIRCUIT
Filed April 17, 1961

WITNESSES

INVENTORS
Jack W. Ogden &
Deryl G. McDaniel
BY
ATTORNEY

United States Patent Office 3,210,635
Patented Oct. 5, 1965

3,210,635
TRANSFORMER-RECTIFIER CIRCUIT
Jack W. Ogden and Deryl G. McDaniel, Shawnee Township, Allen County, Ohio, assignors to Westinghouse Electric Corporation, East Pittsburgh, Pa., a corporation of Pennsylvania
Filed Apr. 17, 1961, Ser. No. 103,371
4 Claims. (Cl. 321—5)

This invention relates in general to transformer-rectifier circuits and, more particularly, to transformer-rectifier circuits for converting three-phase alternating current to direct current.

It is well known in the transformer-rectifier art to convert three-phase alternating current to twelve-phase alternating current before rectification for the purpose of reducing the ripple in the rectified current and also reducing the magnitude of the average current at each rectifier. In the prior art, a twelve-phase secondary current is conventionally obtained by utilizing a Y-delta to quadruple Y transformer winding configuration. This configuration is comprised of two transformers, one having a delta connected primary and a double Y connected secondary, and the other a Y connected primary and a double Y connected secondary. The two transformers are connected in parallel circuit relationship to the three-phase supply line. Of course, when connected in such a configuration, the delta connected transformer primary phase voltage is greater in magnitude than the Y connected transformer primary phase voltage by a factor of the $\sqrt{3}$. Attempts to equalize the phase voltages resulted in primary windings of different turns, different impedances, and with different volts per turn relations. These factors result in output voltages that are unequal in both magnitude and performance. This inequality in magnitude and performance of the output voltages causes a ripple voltage of a relatively high magnitude and, of course, also causes an uneven division of load between the two transformers.

It is therefore the general object of this invention to provide a new and improved transformer-rectifier circuit having an improved transformer winding configuration for converting three-phase alternating current to twelve-phase alternating current.

It is a more particular object of this invention to provide a new and improved transformer-rectifier circuit having an improved transformer winding configuration for converting a three-phase alternating current to a twelve-phase alternating current which will provide equal voltages from each of the twelve phases.

Briefly, the present invention accomplishes the above cited objects by providing a configuration comprising two identical transformers each having an extended delta connected primary and a double Y connected secondary. The primary windings of the transformers are connected to shift the phase from the applied line voltage by 15°. By connecting the two identical transformers in opposite phase rotation the one transformer shifts the phase from the applied line voltage 15° in one direction and the other transformer shifts the phase from the applied line voltage 15° in the other direction. The resultant phase shift between the two transformers is therefore 30° as required for twelve-phase operation, but is accomplished with two identical transformers to thereby eliminate the high ripple and uneven load distribution caused by the $\sqrt{3}$ factor of previous designs.

Other objects and advantages of this invention will become apparent from the detailed description which follows when taken in conjunction with the accompanying drawings, in which.

Figure 1:
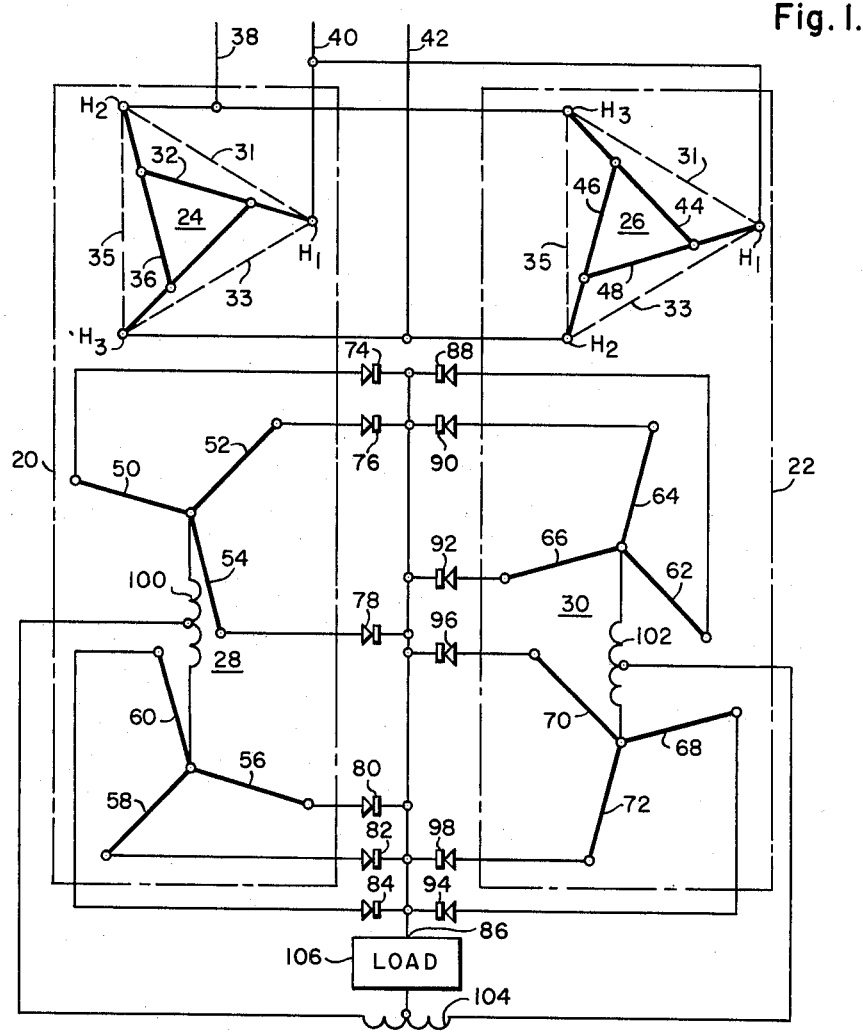
FIGURE 1 is a schematic diagram of a transformer-rectifier circuit constructed in accordance with the present invention.

Referring to FIGURE 1, it can be seen that the illustrated transformer-rectifier circuit comprises two identical transformers 20 and 22. Each of said transformers 20 and 22 has a three winding primary 24 and 26, respectively, and a six winding secondary 28 and 30, respectively. Winding 32 of transformer 20 and winding 48 of transformer 22 are identical windings on their respective transformers. Similarly, windings 34 and 44, 36 and 46, 50 and 66, 52 and 62, 54 and 64, 56 and 68, 58 and 70, and 60 and 72, are also identical windings on their respective transformers 20 and 22 respectively. The extended delta connected primary windings 32, 34 and 36 of the transformer 20 are connected to the three phase input leads 38, 40 and 42 in parallel circuit relationship with the extended delta connected primary windings 44, 46 and 48 of the transformer 22. The three primary windings 32, 34 and 36 of the transformer 20 are designed so as to cause a voltage phase shift with respect to the reference three-phase alternating current input voltage of 15°. The primary windings 44, 46 and 48 of the transformer 22 are designed to shift the voltage 15° with respect to the reference three-phase alternating current input voltage and connected to shift the voltage 30° with respect to the voltage of the parallel connected primary windings 32, 34, and 36, respectively, of the transformer 20. The phase relationship of the applied voltage with respect to the primary winding voltages is shown in FIGURE 1 with the applied voltages being represented by the dashed vector 31, 33 and 35. The 15° phase shift is accomplished by use of an extended delta winding configuration. The extended delta is a configuration in which the adjacent windings are not connected at their terminals but, rather, each winding is provided with two terminals and a tap at a predetermined distance from the ends, one end of each winding is connected to a line conductor, and the other end of each winding is connected to the tap on the adjacent winding. For example, in primary 24 the first terminal of the winding 36 is connected to the line conductor 38 and the second terminal is connected to the tap of the second winding 34. The winding 34 has one terminal connected to the line conductor 42 and the other terminal connected to the tap of the winding 32. The winding 32 has one terminal connected to line conductor 40 and the other terminal to the tap of the winding 36. As illustrated, the tap on each primary winding is located a distance from the end which will result in a phase shift of 15° and the primary windings 24 and 26 are connected in a manner to give a 30° phase shift between respective windings on the two transformers. That is, one of the two identical transformers has terminal H1 connected to line conductor 40, terminal H2 connected to line conductor 38 and terminal H3 connected to line conductor 42. The other trasformer has terminal H1 connected to line conductor 40, terminal H2 connected to line conductor 42 and terminal H3 connected to line conductor 38. When so connected one transformer is said to have an opposite phase rotation relative to the other and thereby causes the 30° phase shift between the respective windings of the two identical transformers.

The six secondary windings 50, 52, 54, 56, 58 and 60 of the transformer 20 form a double Y connection and the six secondary windings 62, 64, 66, 68, 70 and 72 of the transformer 22 form another double Y connection.

As is conventional in a double Y secondary configuration a pair of windings is associated with each primary winding and are connected in opposite directions so that a phase relationship of 180° is obtained between the windings of each pair. For example, the instantaneous voltage produced by the secondary winding 50 has a phase relationship of 180° with respect to the instantaneous voltage produced by the secondary winding 56 and both of the windings 50 and 56 are responsive to the primary winding 32. Similarly, the other secondary winding pairs 52 and 58, 54 and 60, 62 and 70, 64 and 72, and 66 and 68 have a 180° phase relationship with each other and are responsive to the primary windings 34, 36, 44, 46 and 48, respectively. Therefore, each of the transformers 20 and 22 has a six phase voltage output, and since the respective primary windings have a phase angle between them of 30°, a twelve phase voltage from the transformers 20 and 22 results when the transformers are connected in parallel circuit relationship.

A plurality of diodes 74, 76, 78, 80, 82 and 84, each having an anode connected to the six secondary windings 50, 52, 54, 56, 58 and 60, respectively, of the transformer 20 and each having a cathode connected to the positive terminal 86 of the direct current load circuit, provide a direct current voltage having a six phase ripple frequency. Similarly, another six diodes 88, 90, 92, 94, 96 and 98, each having an anode connected to the secondary windings 62, 64, 66, 68, 70 and 72, respectively of transformer 22 and a cathode connected to the positive terminal 86 of the direct current load circuit, also provide a direct current voltage having a six phase ripple frequency. Because of the 30° phase difference between the primary windings 32, 34 and 36 of transformer 20 and the primary windings 48, 46 and 44 of transformer 22, respectively, a resultant twelve phase ripple frequency is present at the positive terminal 86 of the direct current load circuit 106.

Although the circuit is described with the anodes of the diodes connected to the transformer secondary and the cathodes connected to the positive terminal of the direct current load circuit, it is to be understood that the diodes could be poled the opposite way, that is, with the cathode connected to the transformer winding and the anode connected to the negative terminal of the direct current load circuit.

The two sets of three Y connected windings of the secondary 28 have their neutrals interconnected in the conventional manner by a first interphase winding 100. A second interphase winding 104 interconnects the center tap of the first interphase winding 100 and the center tap of an identical third interphase winding 102, which interconnects the neutrals of the two sets of three Y connected windings of the other secondary 30.

The load 106 for the transformer rectifier device is connected between the center tap of interphase winding 104 and the positive direct current load circuit terminal 86.

Figures 2, 3:
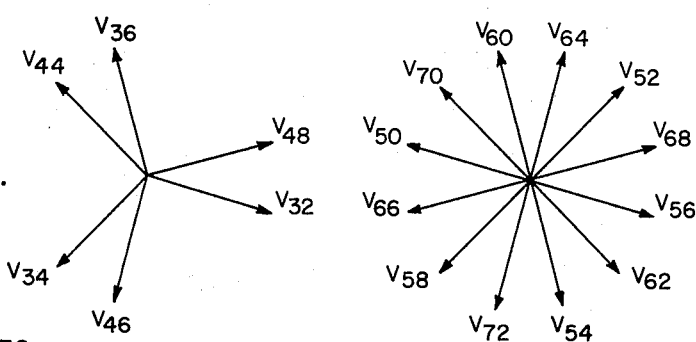
FIGURE 2 is a vector diagram showing the phase relationship of the voltages of the primary windings of the transformers shown in FIGURE 1.
FIGURE 3 is a vector diagram showing the phase relationship of the voltages of the secondary windings of the transformers shown in FIGURE 1.

FIGURE 2 is a vector diagram of the phase to neutral voltages of the transformer primaries 24 and 26. Of course, the voltages of the three windings of each transformer primary have a phase difference of 120° and the phase difference between a primary winding of one transformer and the corresponding primary winding of the other transformer is 30°. The vector $V_{48}$ represents the voltage of the winding 48, vector $V_{36}$ represents the voltage of the winding 36, vector $V_{44}$ represents the voltage of winding 44, vector $V_{34}$ represents the voltage of the winding 34 and vector $V_{46}$ represents the voltage of the winding 46.

FIGURE 3 is a vector diagram of the twelve phase to neutral voltages of the two double Y connected secondaries 28 and 30. Again, the subscript of the vector reference character corresponds to the reference character of the secondary winding represented by that vector.

Since numerous changes may be made in the above described apparatus and other embodiments of the invention may be made without departing from the spirit and scope thereof, it is intended that the matter in the foregoing description or shown in the accompanying drawings shall be taken as illustrative and not in a limiting sense.

We claim as our invention:

1. In an improved transformer-rectifier circuit for converting alternating current to direct current, a first and a second three phase transformer, each of said transformers having an extended delta connected primary and a double Y connected secondary with a pair of secondary windings for each primary winding, said extended delta connected primaries being connected to have opposite phase rotation causing a phase difference between them of 30°, each pair of secondary windings being connected in opposite directions to have a phase difference of 180° between them, means for applying alternating current to be rectified to the primary windings of said first and second transformers in parallel circuit relationship, and means for rectifying the alternating current produced in the secondary windings.

2. In an improved transformer rectifier circuit for converting alternating current to direct current, a first and a second three phase transformer, each of said transformers having an extended delta connected primary and a double Y connected secondary with a pair of secondary windings for each primary winding, said extended delta connected primary of said first transformer being connected in parallel circuit relationship with said extended delta connected primary of said second transformer, said parallel connected primaries being adapted to be energized from a three phase alternating current source, said extended delta connected primary of said first transformer causing a phase shift of 15° with respect to the three phase alternating current input, said extended delta connected primary of said second transformer causing a phase shift of 15° with respect to the reference three phase alternating current input, and said second transformer being connected to have opposite phase rotation from the first transformer causing a phase shift of 30° with respect to said extended delta connected primary of said first transformer, the windings of each pair of secondary windings being connected oppositely to have a phase difference of 180° between them, and means for rectifying the alternating current produced in the secondary windings of said transformers.

3. In an improved transformer rectifier circuit for converting alternating current to direct current, a first and a second three phase transformer, each of said transformers having an extended delta connected primary and a double Y connected secondary with a pair of secondary winding for each primary winding, the neutral points of the secondaries for each primary winding being connected by an interphase winding having a center tap, said extended delta connected primary of said first transformer being connected in parallel circuit relationship with said extended delta connected primary of said second transformer, said parallel connected primaries being adapted to be energized from a three phase alternating current source, said extended delta connected primary of said second transformer being connected to have opposite phase rotation from the first transformer causing a phase difference of 30° with respect to said extended delta connected primary of said first transformer, the windings of each pair of secondary windings being connected oppositely to have a phase difference at 180° between them, a plurality of unidirectional conductive devices each having a first and a second terminal, means for connecting the first terminal of an individual one of said devices to one end of each of said secondary windings, a direct current load circuit, and means for connecting one terminal of said load circuit to the second terminals of said devices, and a third interphase winding connected between the center taps on the first two interphase windings and having a center tap connected to the other terminal of the load circuit.

4. In an improved transformer rectifier circuit for converting alternating current to direct current, a first and a second three phase transformer, each of said transformers having an extended delta connected primary and a double Y connected secondary with a pair of secondary windings for each primary winding, said extended delta connected primary of said first transformer being connected in parallel circuit relationship with said extended delta connected primary of said second transformer, said parallel connected primaries being adapted to be energized from a three phase alternating current source, said extended delta connected primary of said first transformer causing a phase shift of 15° with respect to the reference three phase alternating current input voltage, said extended delta connected primary of said second transformer causing a phase shift of 15° with respect to the reference three phase alternating current input, and said second transformer being connected to have opposite phase rotation from the first transformer causing a phase shift of 30° with respect to said extended delta connected primary of said first transformer, the windings of each pair of secondary windings being connected oppositely to have a phase difference at 180° between them, a plurality of half wave rectifying means each having a first and a second electrode, means connecting the first electrode of each of said rectifying means to one end of a different winding of said double Y connected secondary windings and means connecting the second electrode to a direct current load circuit, a first and a second interphase winding each provided with a center tap, said double Y connected secondary winding of said first transformer having said first interphase winding associated therewith, said double Y connected secondary of said second transformer having said second interphase winding associated therewith, a third interphase winding connected between the center taps of said first and second interphase windings, said third interphase winding having a center tap connected to the direct current load circuit.

References Cited by the Examiner

UNITED STATES PATENTS

| | | | |
|---|---|---|---|
| 1,699,153 | 1/29 | Mittag | 321—26 |
| 2,038,505 | 4/36 | Winograd | 321—27 |
| 2,128,055 | 8/38 | Rose | 321—26 |

FOREIGN PATENTS 387,472  2/33  Great Britain.

LLOYD McCOLLUM, *Primary Examiner.*
SAMUEL BERNSTEIN, *Examiner.*